PROCESS FOR PREPARING BIURET POLYISOCYANATES

Hans Joachim Hennig, Cologne-Stammheim, Germany, assignor to Farbenfabriken Bayer Aktiengesellschaft, Leverkusen, Germany, a corporation of Germany
No Drawing. Filed Feb. 5, 1964, Ser. No. 342,796
Claims priority, application Germany, Feb. 18, 1963, F 39,044
6 Claims. (Cl. 260—453)

This invention relates to organic polyisocyanates and more particularly to organic polyisocyanates which contain biuret groups and a method for the preparation thereof.

Organic polyisocyanates which have at least two and preferably more than two free —NCO groups are very important for the production of polyurethane plastics which may be either homogeneous or porous. In German Patent 1,101,394 organic polyisocyanates containing a biuret structure are obtained by reacting organic diisocyanates with water. It is also possible to use in addition to water, hydrogen sulphide or urea diisocyanates, all of said reactions being preferably carried out at temperatures of from about 70 to about 200° C. The biuret polyisocyanates formed, especially by the reaction of water with an organic diisocyanate, form two immiscible phases so that the reaction is somewhat difficult and the product not always homogeneous.

It is therefore an object of this invention to provide a process for the preparation of biuret polyisocyanates which are substantially devoid of the foregoing disadvantages. Another object of this invention is to provide a method of preparing polyisocyanates which are homogeneous and have very few troublesome deposits in the reaction vessel. Another object of this invention is to provide for more complete reaction of components of a biuret polyisocyanate. Still a further object of this invention is to provide a method of preparing biuret polyisocyanates from components which may be more homogeneously mixed with each other. Another object of this invention is to provide a method of preparing biuret polyisocyanates having fewer relatively insoluble polyurea by-products.

The foregoing objects and others which will become apparent from the following description are accomplished in accordance with the invention, generally speaking, by providing a process for the preparation of biuret polyisocyanates wherein an organic polyisocyanate is reacted with formic acid preferably at a temperature of from about 80 to about 200° C. Unexpectedly, carbon monoxide is split off in this reaction in addition to carbon dioxide yielding a biuret polyisocyanate.

It was known prior to the process of the present invention that the reaction of isocyanates with carboxylic acids yielded mixed anhydrides of carbamic and carboxylic acids, the stability of which depended on the acidity of the carboxylic acid and the reactivity of the isocyanates. Even the mixed anhydrides obtained from very weak acids and very highly reactive aromatic isocyanates, even those substituted with nitro groups which could be separated out, decompose upon moderate heating to form carboxylic acid amides with the evolution of carbon dioxide. Unexpectedly, when formic acid is reacted with an organic polyisocyanate and preferably a monomeric organic diisocyanate such as hexamethylene diisocyanate, carbon dioxide is evolved spontaneously on combining the reactants. The fact that the mixed anhydride is first formed in this case is also shown from investigations with carboxylic acids where the carboxyl carbon atom has been radioactively marked. In this latter case, the carbon dioxide evolved shows no radioactivity.

The process of the invention yields the now common biuret polyisocyanates which may have the following formula

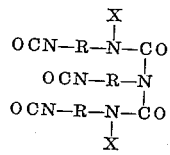

wherein R is an organic radical obtained by removing the —NCO groups from an organic diisocyanate. The organic radicals may be substituted or contain hetero atoms depending on the constituency of the original organic diisocyanate. X in the foregoing formula represents hydrogen or the grouping

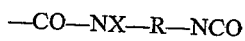

wherein X and R have the meanings set forth above. It is preferred to react at least three mols of a monomeric organic diisocyanate per mol of formic acid at temperatures of about 80 to about 200° C. at least toward the end of the reaction. While at least three mols of organic diisocyanate should be present per mol of formic acid, it is most advantageous to use larger excesses of organic diisocyanate, i.e. preferably about 6 to about 10 mols of monomeric organic diisocyanate per mol of formic acid. When the larger excesses are used, the diisocyanate functions as a solvent for the biuret polyisocyanate product which is formed. After completing the reaction, the monomeric organic diisocyanate can be separated by conventional processes such as distillation thin film evaporation or extraction from the biuret polyisocyanate product.

Alternately, one may carry out the reaction in the presence of an inert organic solvent. By "inert" is meant organic solvents which are free of active hydrogen containing groups capable of reacting with —NCO groups. Such compounds are chlorinated, aliphatic or aromatic hydrocarbons such as methylene chloride, o-dichlorobenzene and the like. One may also use esters or ethers such as ethylene glycol, monomethyl ether acetate, dioxane and the like.

The reaction between formic acid and the organic polyisocyanate proceeds rapidly and smoothly with the evolution of stoichiometric quantities of carbon monoxide and carbon dioxide. Whereas monomeric diisocyanates and water form two immiscible phases, the formic acid can be homogeneously mixed with the diisocyanate so that the reaction is considerably facilitated and made homogeneous. The formation of relatively insoluble polyureas which often form troublesome deposits especially on the upper parts of the reaction vessel is substantially avoided.

It is also possible to produce a biuret polyisocyanate in accordance with the process of the invention in stages. For example, one may combine reactants such as toluylene-2,4-diisocyanate and formic acid at room temperature so that a crystalline mixed anhydride is formed which is then decomposed by further heating in a first stage with evolution of carbon dioxide. In a second stage, the reaction mixture is heated to a higher temperature in the range of from about 80 to about 200° C. with the evolution of a stoichiometric quantity of carbon monoxide. In this second stage, the additional isocyanate reactions take place with the formation of a biuret polyisocyanate.

Any suitable organic polyisocyanate, and preferably the aliphatic diisocyanates having from 4 to 6 carbon atoms or aromatic diisocyanates having from 6 to 13 carbon atoms are suitable for the production of the biuret polyisocyanate such as, for example, tetramethylene diisocyanate, cyclohexane-1,4-diisocyanate, dicyclohexylmethane-4,4'-diisocyanate, 2-4- and 2,6-toluylene diisocyanates as well as technical mixtures of these isocyanates, such as 80 percent 2,4- and 20 percent 2,6-toluylene diisocyanate, m- and p-phenylene diisocyanates, diphenylmethane-4,4'-diisocyanate, diphenyldimethyl methane-4,4'-diisocyanate, 1-chlorobenzene-2,4-diisocyanate, 1-ethoxy-2,4-diisocyanate, 1,3-dimethoxybenzene-2,4-diisocyanate, 4,4'-diphenylether diisocyanate, 1,3-di-(isocyanato methyl) cyclobutane, transvinylene diisocyanate, 1-nitrobenzene-2,4-diisocyanate, 4,4'-biphenyl diisocyanate and 4,4'-diphenyl sulphone diisocyanate. In addition, small quantities of monoisocyanates, such as phenyl isocyanate and cyclohexyl isocyanate, and of polyisocyanates of higher valency, such as 1-methylbenzene-2,4,6-triisocyanate or the reaction product of one mol of trimethylol propane with three mols of toluylene diisocyanate can concurrently be employed.

The use of anhydrous formic acid is likewise possible. In order to modify the reaction products, it is possible concurrently to use during the reaction relatively small quantities of compounds with reactive hydrogen atoms, such as diols, i.e. ethylene glycol ureas or acid amides.

The reaction products obtained by the process according to the invention, depending upon the nature of the diisocyanate used, can be highly viscous liquids, clear resins or partly crystalline and partly waxy amorphous products. They have very good solubility in the conventional organic solvents which do not contain any labile hydrogen atoms. Their biuret structure is apparent from their infra-red spectra.

The biuret polyisocyanates of this invention are useful where biuret polyisocyanates have been used heretofore, especially for the production of coating compositions which are light-stable, for the production of polyurethane foams, for example, according to U.S. Reissue Patent 24,514, and for the production of elastomeric polyurethanes. The resulting polyurethane plastics are useful where polyurethanes have been used heretofore, for example, the foams are useful for cushions if they are ample, the rigid foams are useful for both sound and flexible. The coatings may be used to coat thermal insulation. The coatings may be used to coat wood or metals such as steel and the like. The elastomers are useful for molded items such as gear wheels and the like.

The invention is further illustrated by the following examples in which parts are by weight unless otherwise specified.

*Example 1*

About 504 grams (3 mols) of hexane-1,6-diisocyanate are heated at about 150° C. after atmospheric oxygen has been displaced with nitrogen, and then, over about 20 minutes, about 23 grams (0.5 mol) of anhydrous formic acid are added dropwise while stirring vigorously, and vigorous evolution of carbon dioxide and carbon monoxide gas takes place. Simultaneously, the isocyanate content of the reaction material progressively decreases. After continued stirring for about 20 minutes at about 150° C., the —NCO content reaches about 38.8 percent which corresponds to the isocyanate content of a solution of a biuret triisocyanate of 1 mol 1-amino-6-isocyanato hexane and about 2 mols of hexane-1,6-diisocyanate in about 3 mols of hexane-1,6-diisocyanate. After cooling to room temperature, there are obtained about 495 grams of a colorless, clear, thin liquid with a viscosity of about 16.5 cp./25° C. The reduction in weight corresponds to the evolution of about 0.5 mol of carbon dioxide and about 0.5 mol of carbon monoxide.

By repeated extraction of the reaction mixture with n-hexane, residual hexane-1,6-diisocyanate is almost completely removed. After freeing the residue from small quantities of n-hexane by heating at about 50° C. under water jet vacuum, there is left a biuret triisocyanate with an isocyanate content of about 24.9 percent (calculated 26.4 percent) and a viscosity of about 854 cp./25° C. The infra-red spectrum showed absorption bands at 5.9 and 6.1 microns, characteristic of biurets.

*Example 2*

As described in Example 1, about 522 grams (3 mols) of toluylene-2,4-diisocyanate and about 23 grams (0.5 mol) of anhydrous formic acid are reacted for about 15 minutes at about 120° C. After the intense evolution of gas has subsided, the temperature is raised to about 135° C. and the reaction mixture is heated for a further period (about 35 minutes) until the isocyanate content is about 37.8 percent. There is observed a reduction in weight of about 58 grams, which corresponds to the evolution of about 0.5 mol of carbon dioxide and about 0.5 mol of carbon monoxide. The mixture of biuret polyisocyanate and toluylene-2,4-diisocyanate is a light yellow, clear liquid at room temperature, with a viscosity of 112 cp./25° C.

*Example 3*

If about 750 grams (3 mols) of 4,4'-diiocyanate diphenylmethane are used in Example 2 instead of toluylene-2,4-diisocyanate, then, after heating the reaction mixture for about 2 hours at about 130° C., there are obtained about 741 grams of a mixture of biuret polyisocyanate and diisocyanate with about 25.9 percent (calculated 25.7 percent) of —NCO after carbon monoxide and carbon dioxide have been evolved. The product is semi-crystalline and beige in color at room temperature.

*Example 4*

If, when following Example 2, about 23 grams of anhydrous formic acid are added to 522 grams of toluylene-2,4-diisocyanate with cooling at room temperature. Crystals are precipitated and there is, at first, no evolution of gas. On heating to about 50 to about 60° C., carbon dioxide is evolved. After evolution of gas has subsided, the temperature is raised to about 100° C. and heating is continued (about 3½ hours) until the calculated final weight of about 509 grams and the calculated isocyanate content of about 37.2 percent —NCO are reached. The product is a bright yellow, clear liquid of low viscosity, which is a solution of biuret polyisocyanate in toluylene-2,4-dioscyanate.

To isolate the polyisocyanate, the toluylene-2,4-diisocyanate is distilled off under high vacuum using a rotary evaporator. From about 200 grams of mixture, there are recovered about 98 grams of almost monomer-free polyisocyanate with about 24.7 percent (calculate 25.4 percent) of —NCO. The infra-red spectrum shows the absorption bands which are characteristic of biurets.

It is to be understood that the foregoing examples are given for the purpose of illustration and that any other suitable organic polyisocyanate, formic acid or the like could have been used therein provided that the teachings of this disclosure are followed.

Although the invention has been described in considerable detail in the foregoing, it is to be understood that such detail is solely for the purpose of illustration and that variations can be made therein by those skilled in the art without departing from the spirit and scope of the invention except as set forth in the claims.

What is claimed is:

1. A process for the preparation of a biuret polyisocyanate which comprises reacting an organic polyisocyanate with anhydrous formic acid at a temperature of from about 80 to about 200° C. in the molecular ratio of at least 3 mols of organic polyisocyanate per mol of formic acid.

2. A method of preparing a biuret polyisocyanate which comprises reacting a monomeric organic diisocyanate with anhydrous formic acid at a temperature of from about 80 to about 200° C. in such proportions that there are at least about 3 mols of organic diisocyanate present per mol of formic acid.

3. The method of claim 2 wherein about 6 to about 10 mols of organic diisocyanate are initially present per mol of anhydrous formic acid.

4. The method of claim 2 wherein said reaction is carried out in the presence of an inert organic solvent.

5. A method for the preparation of a hexamethylene based biuret polyisocyanate which comprises reacting hexamethylene diisocyanate with anhydrous formic acid at a temperature of from about 80 to about 200° C. in such proportions that there are at least 3 mols of hexamethylene diisocyanate present per mol of formic acid.

6. A process for the preparation of a biuret polyisocyanate which comprises reacting an aliphatic diisocyanate having from 4 to 6 carbon atoms or an aromatic diisocyanate having from 6 to 13 carbon atoms with anhydrous formic acid at a temperature of from about 80 to about 200° C. in such proportions that there are at least about 3 mols of organic diisocyanate present per mol of formic acid.

References Cited

Wagner: Chemical Abstracts, Sept. 1963, vol. 59, page 6406.

Naegeli et al.: Chemical Abstracts, Jan.–Mar. 1935, vol. 29, page 1074–1075.

CHARLES B. PARKER, *Primary Examiner.*

D. H. TORRENCE, *Assistant Examiner.*